United States Patent
Ponce et al.

(10) Patent No.: US 11,095,707 B2
(45) Date of Patent: Aug. 17, 2021

(54) NETWORKING-BASED FILE SHARE WITNESS SYSTEM

(71) Applicant: Dell Products L.P., Round Rock, TX (US)

(72) Inventors: Javier A. Ponce, Georgetown, TX (US); Rizwan Ali, Cedar Park, TX (US); Dharmesh M. Patel, Round Rock, TX (US); Ravikanth Chaganti, Banaglore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/656,056

(22) Filed: Oct. 17, 2019

(65) Prior Publication Data
US 2021/0120070 A1 Apr. 22, 2021

(51) Int. Cl.
| | |
|---|---|
| H04L 29/08 | (2006.01) |
| H04L 29/06 | (2006.01) |
| G06F 16/178 | (2019.01) |
| G06F 16/182 | (2019.01) |
| G06F 16/176 | (2019.01) |
| H04L 12/46 | (2006.01) |

(Continued)

(52) U.S. Cl.
CPC .......... *H04L 67/06* (2013.01); *G06F 16/176* (2019.01); *G06F 16/178* (2019.01); *G06F 16/1824* (2019.01); *G06F 16/2365* (2019.01); *H04L 12/4641* (2013.01); *H04L 61/2007* (2013.01); *H04L 63/101* (2013.01); *H04L 67/10* (2013.01)

(58) Field of Classification Search
CPC . H04L 67/06; H04L 12/4641; H04L 61/2007; H04L 63/101; H04L 67/10; G06F 16/1824; G06F 16/176; G06F 16/178
See application file for complete search history.

(56) References Cited

U.S. PATENT DOCUMENTS

| 1,016,909 A1 | 1/2019 | Nishanov et al. |
| 10,630,571 B1 * | 4/2020 | Brooker ................. H04L 45/28 |

(Continued)

OTHER PUBLICATIONS

Charbel Nemnom Cloud & DataCenter, (Aug. 6, 2018), How to Configure File Share Witness With USB Thumb Drive on #Windows-Server2019 #S2D #Cluster #StorageSpacesDirect [Blog Post]. Retrieved from https://charbelnemnom.com/2018/08/how-to-configure-file-share-witness-with-usb-thumb-drive-on-windowsserver2019-windowsserver-s2d-cluster-storagespacesdirect/.

*Primary Examiner* — Viet D Vu
(74) *Attorney, Agent, or Firm* — Haynes and Boone, LLP

(57) ABSTRACT

A networking-based file share witness system includes a cluster system including a plurality of node devices, and a first networking device that is coupled to a network and to each of the node devices in the cluster system. The first networking device includes a first networking engine that transmits data between the network and the node devices in the cluster system. The first networking device also includes a first file share that stores a quorum file that is configured to provide, subsequent to the unavailability of at least one of the node devices in the cluster system, a first file share witness vote that is configured to be utilized with at least one node vote provided by at least one of the node devices in the cluster system that remains available in order to reach a quorum and allow the cluster system to continue to operate.

14 Claims, 8 Drawing Sheets

(51) Int. Cl.
*H04L 29/12* (2006.01)
*G06F 16/23* (2019.01)

(56) References Cited

U.S. PATENT DOCUMENTS

| | | | | |
|---|---|---|---|---|
| 2013/0191453 A1* | 7/2013 | Nishanov | ............. | G06F 9/5061 709/204 |
| 2015/0193168 A1* | 7/2015 | Sundaram | ............. | G06F 3/0619 711/114 |
| 2020/0112499 A1* | 4/2020 | Casacio | ................. | H04L 43/10 |

* cited by examiner

NETWORKING-BASED FILE SHARE WITNESS SYSTEM

BACKGROUND

The present disclosure relates generally to information handling systems, and more particularly to providing a file share witness in a networking system provided with an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided via Hyper-Converged Infrastructure (HCI) systems, which are software-defined Information Technology (IT) infrastructures that virtualize elements of conventional "hardware-defined" systems, and may be provided by virtualized computing (e.g., via a hypervisor), a virtualized Storage Area Network (SAN) (e.g., software-defined storage), and in some situations virtualized networking (e.g., storage-defined networking), any or all of which may be provided using commercial "off-the-shelf" server devices. HCI systems are rapidly replacing legacy infrastructure that uses separate physical server devices, storage devices, and networking devices, and are also being implemented in a variety of new use cases. For example, it is becoming more and more common to deploy HCI systems at the edge of a network (e.g., remote business locations that are at the "edge" of the network utilized by a business), a trend which is expected to continue with the adoption of 5G wireless networks.

In many situations, HCI systems that are deployed at a network edge are provided by storage-dense HCI server "nodes" or "building blocks" that are clustered together in the remote business location, with the nodes in the cluster system operating together as a single distributed resource via Internet Protocol (IP) networks connected to the HCI topology. However, when an even number of nodes are provided in a cluster system and a network failure/disruption occurs, a "split brain" type of event is introduced that can adversely affect the functionality of the cluster system and, in some cases, force of a shutdown of the services provided by the cluster system. For example, if a two node device cluster system experiences a failure of a first node device, the remaining second node device will become the primary node device in the cluster system that is the "owner" of the cluster system. Subsequently, when the failed first node device recovers (e.g., the "recovered first node device"), the primary second node device and the recovered first node device will compete for the designation of primary node device, which one of skill in the art in possession of the present disclosure will recognize can adversely affect the functionality of the cluster system.

In order to address such issues, a voting scheme is provided in which a quorum file stored in a file share is used as a quorum witness (often referred to as a "file share witness") to assist in a voting mechanism that determines which of the node devices in the cluster system will operate as the primary node device. For example, a file share witness may be provided for the two node device cluster system discussed above, with each node device having a vote and the file share witness having a vote. As such, in the event one of the node devices fails, the file share witness provides a vote to keep the quorum and elect the remaining node device as the primary node device such that the cluster system continues to function properly. However, conventional file share witnesses are provided as separate and autonomous systems for each cluster system, and require separate hardware and software, maintenance services, security functionality, and/or other file share witness components known in the art. As such, in situations like those discussed above in which HCI systems are provided at the edge of a network, the requirements for providing a file share witness can become impractical. For example, with the two node device cluster system discussed above providing the HCI system at the edge of a network, each file share witness for the two node device cluster system may provided on a separate server device, Network Attached Storage (NAS) device, and/or other device, thus requiring multiples of those devices when a "highly available" file share witness service is desired that provides multiple file share witnesses. Thus, file share witnesses in edge computing situations are associated with higher costs. Conventional solutions to these issues include providing the file share witness connected to the HCI system via a network (i.e., "in the cloud), but such network/cloud-based file share witness systems require persistent network connectivity that may not be available in the HCI systems located at the edge of a network as discussed above.

Accordingly, it would be desirable to provide a file share witness system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide: a first networking engine that is configured to: transmit data between a network and a plurality of node devices in a cluster system; and a first file share that is configured to: store a quorum file that is configured to provide, subsequent to the unavailability of at least one of the plurality of node devices in the cluster system, a first file share witness vote that is configured to be utilized with at least one node vote provided by at least one of the plurality of node devices in the cluster system that remains available in order to reach a quorum and allow the cluster system to continue to operate.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
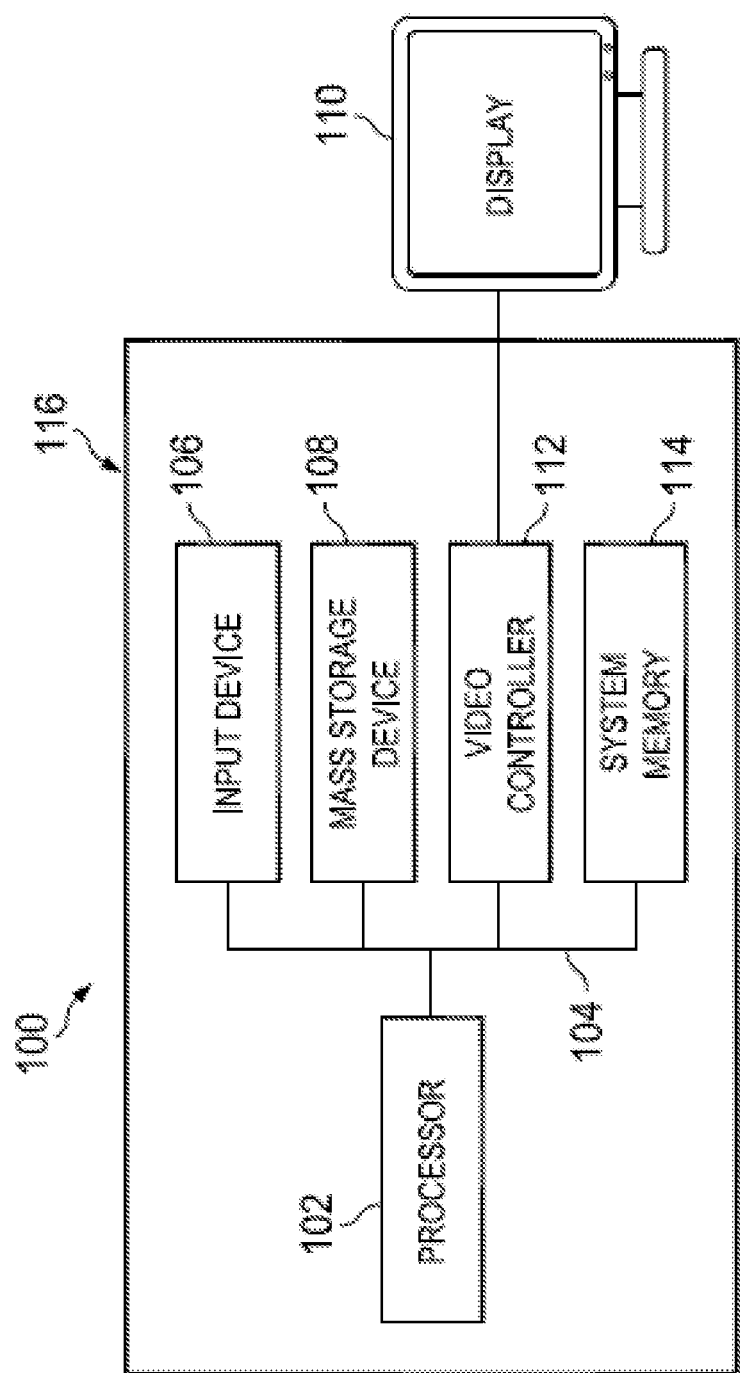
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
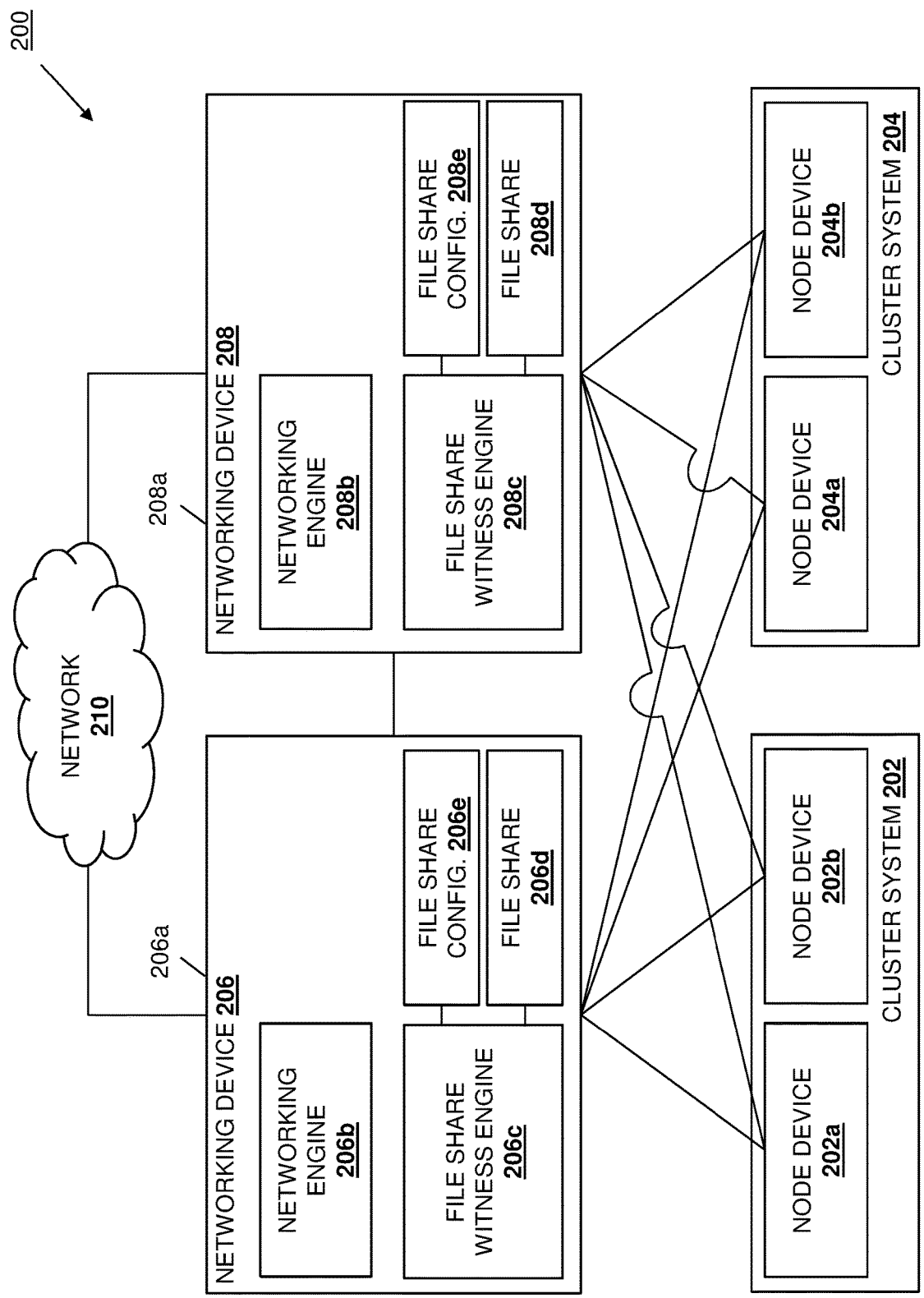
FIG. 2 is a schematic view illustrating an embodiment of a networking-based file share witness system.

Referring now to FIG. 2, an embodiment of a networking-based file share witness system 200 is illustrated. In the illustrated embodiment, the networking-based file share witness system 200 incudes a plurality of cluster systems such as the cluster systems 202 and 204 illustrated in FIG. 2. For example, in the illustrated embodiment the cluster system 202 includes a pair of node devices 202a and 202b, and the cluster system 204 includes a pair of node devices 204a and 204b. In an embodiment, any or all of the node devices 202a, 202b, 204a, and 204b may be provided by the IHS 100 discussed above with reference to FIG. 1, and/or may include some or all of the components of the IHS 100. In the examples provided below, the cluster systems 202 and 204 are provided by Hyper-Converged Infrastructure (HCI) systems, with each of the node devices 202a, 202b, 204a, and 204b provided by storage-dense server devices. However, while illustrated and discussed as provided by server devices in HCI systems, one of skill in the art in possession of the present disclosure will recognize that cluster systems and node devices provided in the networking-based file share witness system 200 may include any types of clustered systems, devices, and/or applications that may be configured to operate similarly as discussed below.

For example, the MICROSOFT® EXCHANGE® email applications available from MICROSOFT® Corporation of Redmond, Wash., United States provides an email application that may be clustered and that may make use of a file share witness service provided according to the teachings of the present disclosure. Similarly, the MICROSOFT® Structured Query Language (SQL) database applications may be utilized an "always-on" cluster feature that may also make use of the file share witness provided according to the teachings of the present disclosure as well. Furthermore, in the examples below, the cluster systems/HCI systems are discussed as being provided by edge-based cluster systems/HCI systems that are located at a network edge, but one of skill in the art in possession of the present disclosure will recognize that other cluster system locations may benefit from the teachings of the present disclosure and thus will fall within its scope as well.

In the illustrated embodiment, a pair of networking devices 206 and 208 are coupled to each of the node devices 202a, 202b, 208a, and 208b included in the cluster systems 202 and 204. In an embodiment, either or both of the networking devices 206 and 208 may be provided by the IHS 100 discussed above with reference to FIG. 1, and/or may include some or all of the components of the IHS 100. For example, the networking devices 206 and 208 may be provided by Top Of Rack (TOR) switch devices, although other switch devices and/or networking devices may fall within the scope of the present disclosure as well. In a specific example, the networking devices 206 and 208 may each be provided by ½ width, 12 port dense 10/25 Gigabit Ethernet (GbE) TOR switch devices available from DELL® Inc. of Round Rock, Tex., United States. As will be appreciated by one of skill in the art in possession of the present disclosure, the illustrated embodiment of the networking-based file share witness system 200 provides an example of "highly available" edge-based cluster/HCI systems that utilize a pair of redundant networking devices 206 and 208 that each may operate to ensure network connectivity for the cluster/HCI systems in the event of the failure or unavailability of the other networking device. However, one of skill in the art in possession of the present disclosure will appreciate that other configurations may benefit from the teachings of the present disclosure and thus will fall within its scope as well.

In the illustrated embodiment, the networking device 206 includes a chassis 206a that houses the components of the networking device 206, only some of which are illustrated in FIG. 2. For example, the chassis 206a may house a processing system (not illustrated, but which may include the processor 102 discussed above with reference to FIG. 1) and a memory system (not illustrated, but which may include the memory 114 discussed above with reference to FIG. 1, which may be provided by, for example, a variety of volatile memory devices known in the art) that is coupled to the processing system and that includes instructions that, when executed by the processing system, cause the processing system to provide a networking engine 206b that is configured to perform the functionality of the networking engines and/or networking devices discussed below. In addition, the memory system housed in the chassis 206a (e.g., the memory 114 discussed above with reference to FIG. 1 that may be provided by, for example, a variety of volatile memory devices known in the art, as discussed above) may include instructions that, when executed by the processing system, cause the processing system to provide a file share witness engine 206c that is configured to perform the functionality of the file share witness engines and/or networking devices discussed below. Furthermore, the chassis 206a may also house a non-volatile/persistent memory/storage system (e.g., a relatively high speed, persistent memory/storage system that may be provided by non-volatile memory devices or other relatively high-speed, persistent storage systems such as Non-Volatile Memory express (NVMe) storage devices, Solid State Drive (SSD) storage devices, and/or other similar memory/storage systems known in the art) that may store a file share 206d and a file share configuration 206e that may be utilized by the file share witness engine 206c as discussed below. As illustrated, the networking device 206 may be coupled to a network 210 (e.g., a Local Area Network (LAN), the Internet, combinations thereof, etc.)

Similarly, the networking device 208 includes a chassis 208a that houses the components of the networking device 208, only some of which are illustrated in FIG. 2. For example, the chassis 208a may house a processing system (not illustrated, but which may include the processor 102 discussed above with reference to FIG. 1) and a memory system (not illustrated, but which may include the memory 114 discussed above with reference to FIG. 1, which may be provided by, for example, a variety of volatile memory devices known in the art) that is coupled to the processing system and that includes instructions that, when executed by the processing system, cause the processing system to provide a networking engine 208b that is configured to perform the functionality of the networking engines and/or networking devices discussed below. In addition, the memory system housed in the chassis 208a (e.g., the memory 114 discussed above with reference to FIG. 1 that may be provided by, for example, a variety of volatile memory devices known in the art, as discussed above) may include instructions that, when executed by the processing system, cause the processing system to provide a file share witness engine 208c that is configured to perform the functionality of the file share witness engines and/or networking devices discussed below. Furthermore, the chassis 208a may also house a non-volatile/persistent memory/storage system (e.g., a relatively high speed, persistent memory/storage system that may be provided by non-volatile memory devices or other relatively high-speed, persistent storage systems such as Non-Volatile Memory express (NVMe) storage devices, Solid State Drive (SSD) storage devices, and/or other similar memory/storage systems known in the art) that may store a file share 208d and a file share configuration 208e that may be utilized by the file share witness engine 208c as discussed below. As illustrated, the networking device 208 may be coupled to the network 210 (e.g., a Local Area Network (LAN), the Internet, combinations thereof, etc.)

Below is an example of a file share witness configuration 206e/208e that may be utilized by the file share witness engines 206c/208c:

[FSWLocalHost]
   Local Host IP Address
[global]
   workgroup=DellEMC.dev
   server string=samba
   server security=USER
   encrypt passwords=YES
   smb passwd file=/etc/samba/smbpasswd
   hosts allow=<Cluster Virtual IP>
[FileShare]
   path=/fsw
   browsable=yes
   writable=yes
   guest ok=no
   read only=no As will be appreciated by one of skill in the art in possession of the present disclosure, the example of the primary file share witness configuration 206c/208c above may be utilize by the file share witness engines 206c/208c to provide a file share that is accessible to the node devices in the cluster system, secure, and unlocked. However, while a specific example of a file share configuration is provided, one of skill in the art in possession of the present disclosure will appreciate that any of a variety of file share configurations may be utilized according to the teachings of the present disclosure while remaining within its scope as well. Furthermore, in the event one of the networking devices 206 and 208 is removed from the networking-based file share witness system 200, the file share witness configuration from the remaining networking device may be copied to any networking device that is added to the networking-based file share witness system 200 to replace the networking device that was removed. As will be appreciated by one of skill in the art in possession of the present disclosure, the file share configuration should be consistent across the networking devices 206 and 208, and thus while in the rare situation in which the file share configuration is modified (e.g., on the primary/active networking device), that modified file share configuration will be replicated on the secondary/passive networking device.

In a specific example, the networking engines 206b and 208b in the networking devices 206 and 208, respectively, may be provided by networking processing systems (e.g., Networking Processing Units (NPUs)) that are configured to transmit data traffic between the network 210 and the node devices 202a, 202b, 204a, and 204b in the cluster systems 202 and 204 using a variety of data traffic network transmission techniques that would be apparent to one of skill in the art in possession of the present disclosure. As would be understood by one of skill in the art in possession of the present disclosure, the networking devices 206 and 208 may be associated with a data plane in which the networking devices 206 and 208 essentially operate as a single switch device. Furthermore, the networking processing systems in the networking devices 206 and 208 may perform other switch fabric management functionality, as well as any other functionality that would be apparent to one of skill in the art in possession of the present disclosure.

Further still, in some examples, the file shares 206d and 208d in the networking devices 206 and 208, respectively, may be provided by a portion (e.g., 5-10 MB) of the non-volatile/persistent memory/storage systems (e.g., the NVMe storage devices or SSD storage devices in the networking devices 206 and 208 discussed above) that has been partitioned to store the file shares 206d and 208d, the file share configurations 206e and 208e, as well as other data that enables the file share witness engines 206c and 208c to provide a file share witness service (e.g., a LINUX® operating-system-enabled file share service that is native to the networking device/switch device kernel). As would be understood by one of skill in the art in possession of the present disclosure, the networking devices 206 and 208 may be associated with a control plane in which one of the networking devices 206 and 208 operates to provide a primary/active file share witness service, and the other of the networking devices 206 and 208 operates to provide a secondary/passive file share witness service. For example, and as discussed in the example below, the file share witness engine 206c in the networking device 206 may operate according to the file share configuration 206e to provide the primary/active file share witness service, while the file share witness engine 208c in the networking device 208 may operate according to the file share configuration 208e to provide the secondary/passive file share witness service.

In a specific example, the file share service provided by the file share witness engines 206c and 208c may be provided by the SAMBA® WINDOWS® interoperability suite of programs for LINUX® and UNIX®, the PYTHON® SMB protocol, and/or other file share services that would be apparent to one of skill in the art in possession of the present disclosure. Furthermore, the file shares 206d and 208d may store a quorum file that may include quorum data (e.g., quorum data stored in a log file such as a "witness.log" file), and that may be written to by node devices in the cluster systems as discussed below (e.g., to verify write access to the file share by that node device). As will be appreciated by one of skill in the art in possession of the present disclosure, the quorum file stored in the file shares 206d and 208d may only maintain cluster information, and thus may not require an entire cluster database, enabling the provisioning of the file shares 206d and 208d via the relatively small portion (e.g., 5-10 MB) of the non-volatile/persistent memory/storage system in the networking devices 206 and 208. As discussed below, the file shares 206d and 208d may be periodically updated as the cluster systems change (e.g., when node devices are added or removed from their cluster systems), and node devices in the cluster systems may be configured to utilize the file share 206d or 208d acting as the primary/active file share to achieve a quorum and provide a second vote (in addition to the vote provided by that node device) as part of a cluster system voting system. As such, in the event of a failure of one of the node devices in a cluster, the available node device in that cluster may achieve a voting majority by accessing the quorum file stored in the primary/active file share (e.g., by writing to that quorum file in the primary/active file share), and will be assigned ownership of the resources in its cluster system.

As such, the illustrated embodiment provides an example of a networking device/switch device hybrid design that include both networking/switch fabric management and file share witness services provided distinctly within the networking/switch fabric architecture. However, while specific examples have been provided, one of skill in the art in possession of the present disclosure will recognize that the networking engines 206b and 208b and the file share witness engines 206c and 208c may be provided by separate processing systems included in the networking devices 206 and 208 while remaining within the scope of the present disclosure as well. Furthermore, while a specific networking-based file share witness system 200 has been illustrated and described, one of skill in the art in possession of the present disclosure will recognize that the networking-based file share witness system of the present disclosure may include a variety of components and component configurations while remaining within the scope of the present disclosure as well.

Figure 3:
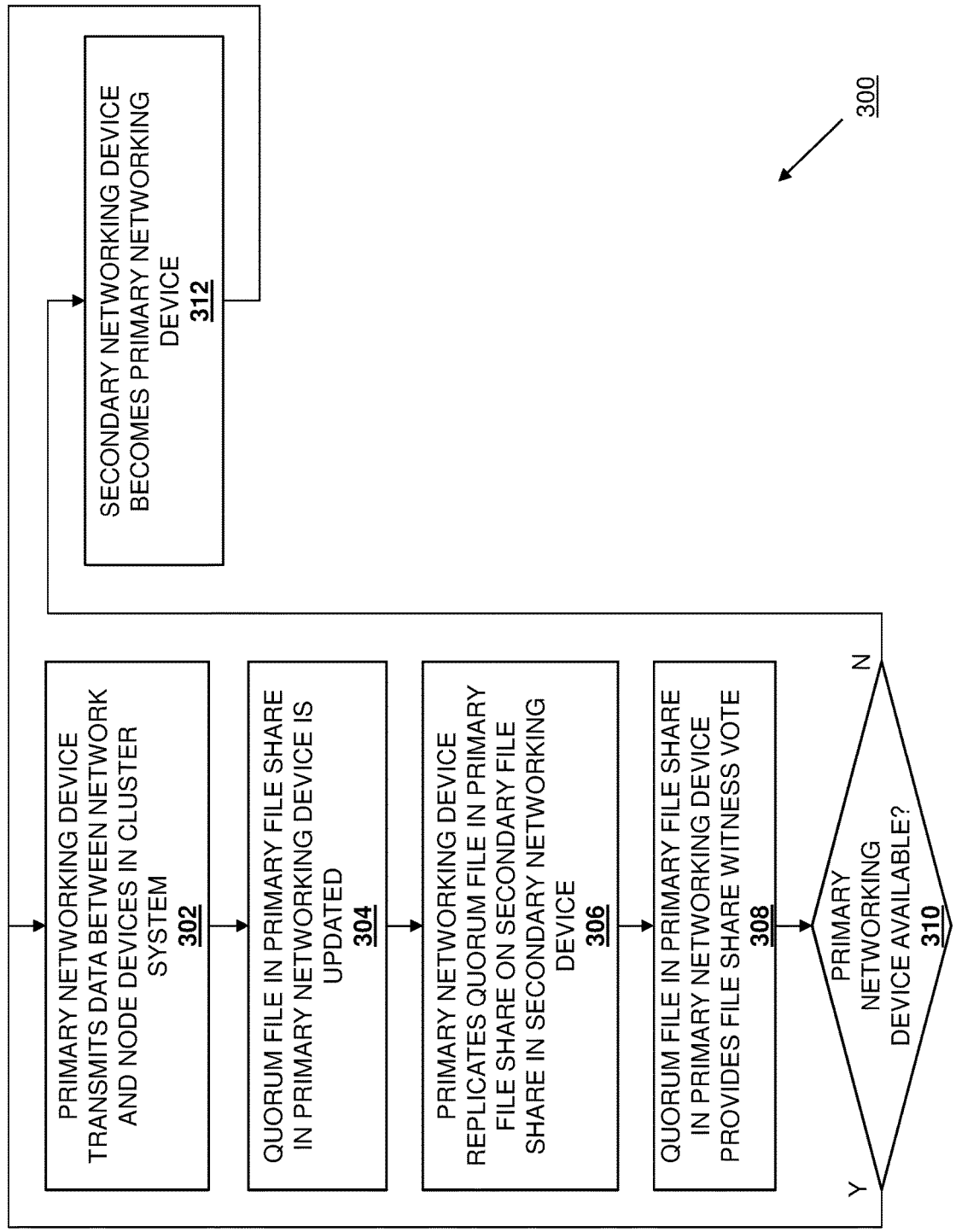
FIG. 3 is a flow chart illustrating an embodiment of a method for providing a networking-based file share witness system.

Referring now to FIG. 3, an embodiment of a method 400 for providing a networking-based file share witness system is illustrated. As discussed below, the systems and methods of the present disclosure may provide a highly-available file share witness system on networking devices at an edge location in a network that requires no additional infrastructure to support that file share witness for the cluster system(s) for which it is being provided, and instead provides the key voting component requirements for the file share witness in the redundant networking fabric provided for those cluster system(s) via a write-accessible file share witness service that maintains cluster system autonomy. This may be accomplished via the utilization of a relatively small portion of a non-volatile/persistent memory/storage system in the networking devices (e.g., 5-10 MB of space in an NVMe storage device, SSD storage device, etc.) to provide redundant file shares that support cluster-voting file share witness requirements via a file share service (e.g., on operating systems that is native to the networking devices) that is configured to replicate the quorum file that is stored in the file share across the redundant networking devices provided for the cluster system, each of which may be provided via a hybrid design that provides networking fabric management and file share witness services within the networking fabric architecture. As such, networking devices provided according to the teachings of the present disclosure may include a networking engine that transmits data between a network and a plurality of node devices in a cluster system, and a file share that stores a quorum file that, subsequent to the unavailability of at least one of the plurality of node devices in the cluster system, provides a file share witness vote that is utilized with at least one node vote provided by at least one of the plurality of node devices in the cluster system that remains available in order to reach a quorum and allow the cluster system to continue to operate. Thus, file share witness(es) may be provided locally at edge locations in a network without the associated hardware overhead and added costs require by conventional file share witness systems.

The method 300 begins at block 302 where a primary networking device transmits data between a network and node device(s) in a cluster system. In an embodiment, at or prior to block 302, the networking devices 206 and 208 may be configured to operate to perform the method 300. In a specific example, the networking devices 206 and 208 may operate during the method 300 as Virtual Link Trunking (VLT) switch devices according to the VLT protocol available in switch devices provided by DELL® Inc. of Round Rock, Tex., United States. As such, each VLT switch device provided by the networking devices 206 and 208 may operate as an instance of a file share witness service (e.g., via the operations of its file share witness engine 206c and 208c, respectively, and its file share 206d and 208d, respectively), with the VLT switch devices functioning in a manner that is similar to a two-node LINUX® cluster, providing a file share witness service that utilizes a "floating" Internet Protocol (IP) address, which may operate similarly to a Virtual Router Redundancy Protocol (VRRP) floating IP address utilized between two switch devices on a Switched Virtual Interface (SVI).

In some embodiments, the file share witness service provided by the networking devices 206 and 208 may be secured via the layer isolated access technique described below. For example, each of the networking devices 206 and 208 may be assigned a respective IP address within a private IP space, with the two instances of the file share witness service provided on the networking devices 206 and 208 (e.g., by the file shares 206d and 208d) utilizing the shared virtual IP that is similar to the VRRP floating IP address between switches on an SVI discussed above, and that as discussed below is provided because only one of the networking devices 206 and 208 operates as the primary networking device for the purposes of providing a file share witness service via the control plane discussed above at any particular time. Furthermore, access to the file share witness service provided by the networking devices 206 and 208 (e.g., access to the file shares 206d and 208d) may be layered behind a non-default Virtual Local Area Network (VLAN) and the IP classless address space discussed above, as well as via an Access Control List (ACL) that is configured to only allow data transmissions and/or other communications that are generated from the primary node device in the cluster systems (i.e., that include the IP address of that primary node device) to reach the file share witness service (e.g., to reach the file shares 206d and 208d). Further still, based on the private IP space provided for the file share witness service (e.g., the file shares 206d and 208d), access to the file share witness service (e.g., via writes to the file shares 206d and 208d) may be controlled via a point-to-point static route between the virtual IP address utilized by the file share witness service (e.g., utilized by the file shares 206d and 208d) and the node devices in the cluster systems.

Figure 4A:
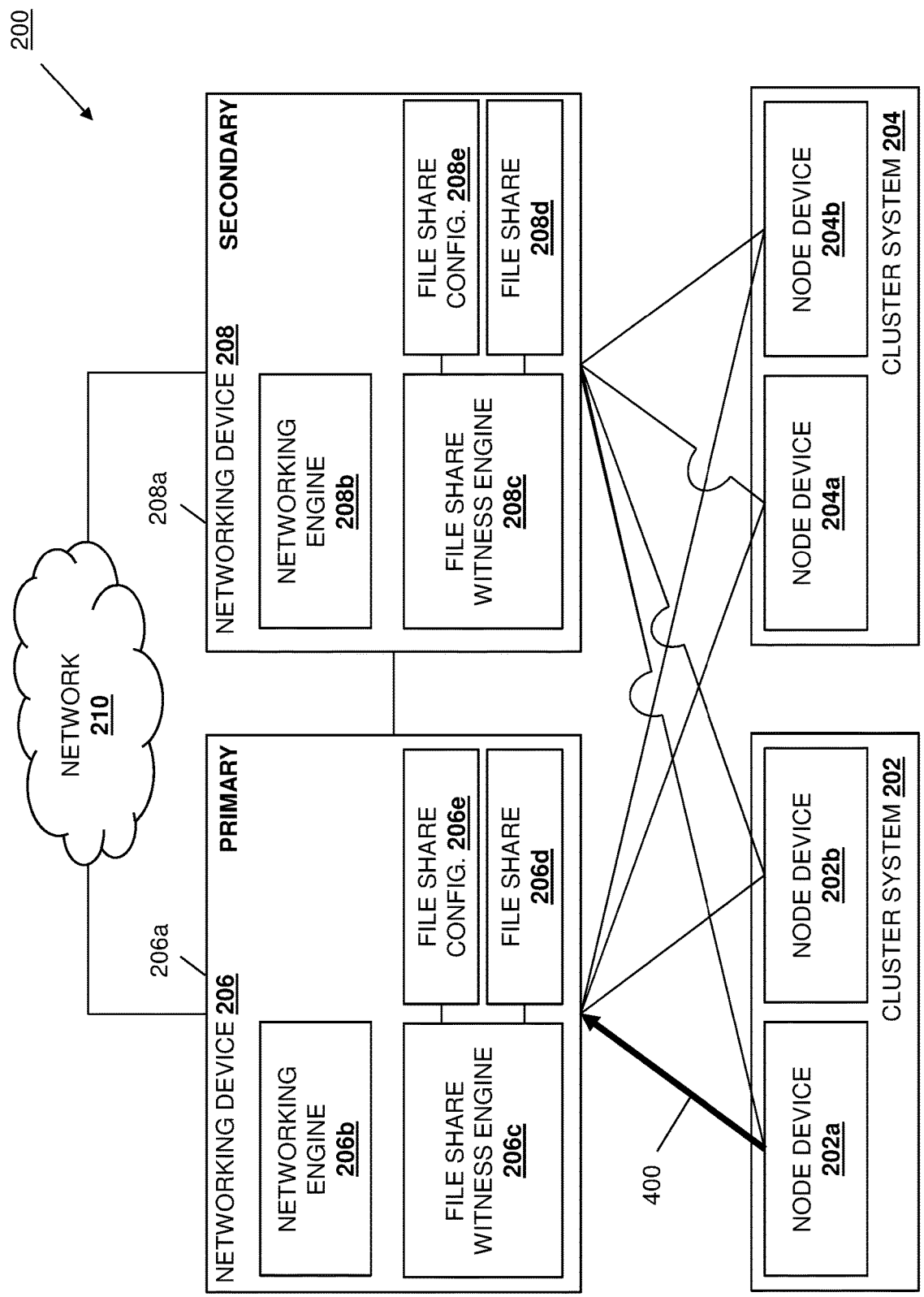
FIG. 4A is a schematic view illustrating an embodiment of the networking-based file share witness system of FIG. 2 operating during the method of FIG. 3.

Thus, in some embodiments, upon startup, reset, and/or other initialization of the networking devices 206 and 208, the networking engines 206b and 208b and/or the file share witness engines 206c and 208c may operate to determine a primary role for one of the networking devices 206 and 208 for purposes of providing an "primary/active" file share witness for control plane functionality, and a secondary role for the other of the networking devices 206 and 208 for purposes of providing a "secondary/passive" file share witness for control plane functionality. For example, FIG. 4A illustrates a primary role for purposes of providing the primary/active file share witness (e.g., "PRIMARY") having been determined for the networking device 206, and a secondary role for purposes of providing the secondary/passive file share witness (e.g., "SECONDARY") having been determined for the networking device 208. As such, as discussed below, the file share witness service provided by the networking device 206 will operate as the "primary/active" file share witness service and the file share 206d in the networking device 206 will operate as the "primary/active" file share, while the file share witness service provided by the file share witness engine 208c in the networking device 208 will operate as the "secondary/passive" file share witness service and the file share 208d in the networking device 208 will operate as the "secondary/passive" file share. However, one of skill in the art in possession of the present disclosure will appreciate that the primary/active role designation and secondary/passive role designation for the networking devices 206 and 208 and file share witness services may switch while remaining within the scope of the present disclosure as well.

In an embodiment, at block 302, the networking engines 206b and 208b in the networking devices 206 and 208 may operate to transmit data between the network 210 and the node devices 202a and 202b in the cluster system 202, as well as between the network 210 and the node devices 204a and 204b in the cluster system 204. As will be appreciated by one of skill in the art in possession of the present disclosure, the discussion below is focused primarily on the operation of the cluster system 202, but the cluster system 204 may operate in substantially the same manner as the cluster system 202 while remaining within the scope of the present disclosure as well. As such, at block 302, data generated and transmitted by host systems (not illustrated) may be received via the network 210 by the networking engines 206b and 208b in the networking devices 206 and 208, and may be transmitted to the node devices 202a and/or 202b (e.g., via routing tables and utilizing a variety of conventional data routing techniques that would be apparent to one of skill in the art in possession of the present disclosure.) Similarly, data generated and transmitted by the node devices 202a, 202b, 204a, and 204b may be received by the networking engines 206b and 208b in the networking devices 206 and 208, and may be transmitted through the network 210 to its destination (e.g., via routing tables and utilizing a variety of conventional data routing techniques that would be apparent to one of skill in the art in possession of the present disclosure.)

The method 300 then proceeds to block 304 where a quorum file in a primary file share in the primary networking device is updated. In an embodiment, at or prior to block 304, a quorum file may be stored in the file share 206d in the networking device 206. For example, following the designation of the primary/active networking device 206/file share witness service and the secondary/passive networking device 208/file share witness service, a primary node (e.g., the node device 202a in the illustrated embodiment) in the cluster system 202 (e.g., an HCI system) may discover the primary/active networking device 206/file share witness service (e.g., a "primary/active" VLT switch device) and its primary file share 206d. As illustrated in FIG. 4A, in response to the discovery operations discussed above, the node device 202a may perform a quorum file update 400 to store a quorum file in the file share 206d.

As will be appreciated by one of skill in the art in possession of the present disclosure, the quorum file stored in the primary/active file share 206d may include information describing a topology of the cluster system 202, as well as any other high-level information about the cluster system 202. Subsequent to the initial storage of the quorum file in the primary/active file share 206d, at block 304, the quorum file in the file share 206d may be updated. For example, subsequent to the initial storage of the quorum file in the primary/active file share 206d, a change may occur in the cluster system 202 and, in response, the primary node (e.g., the node device 202a in the illustrated embodiment) in the cluster system 202 may again perform the quorum file update 400 to update the quorum file that was previously stored in the file share 206d. One of skill in the art in possession of the present disclosure will recognize that the primary node in the cluster system 202 may provide updates to the quorum file stored in the file share 206d in response to any changes that occur in the cluster system 202 including, for example, changes to which node device in the cluster system 202 operates as the primary node, the addition or removal of a node device from the cluster system 202, and/or any other cluster system changes that would be apparent to one of skill in the art in possession of the present disclosure.

Figure 4B:
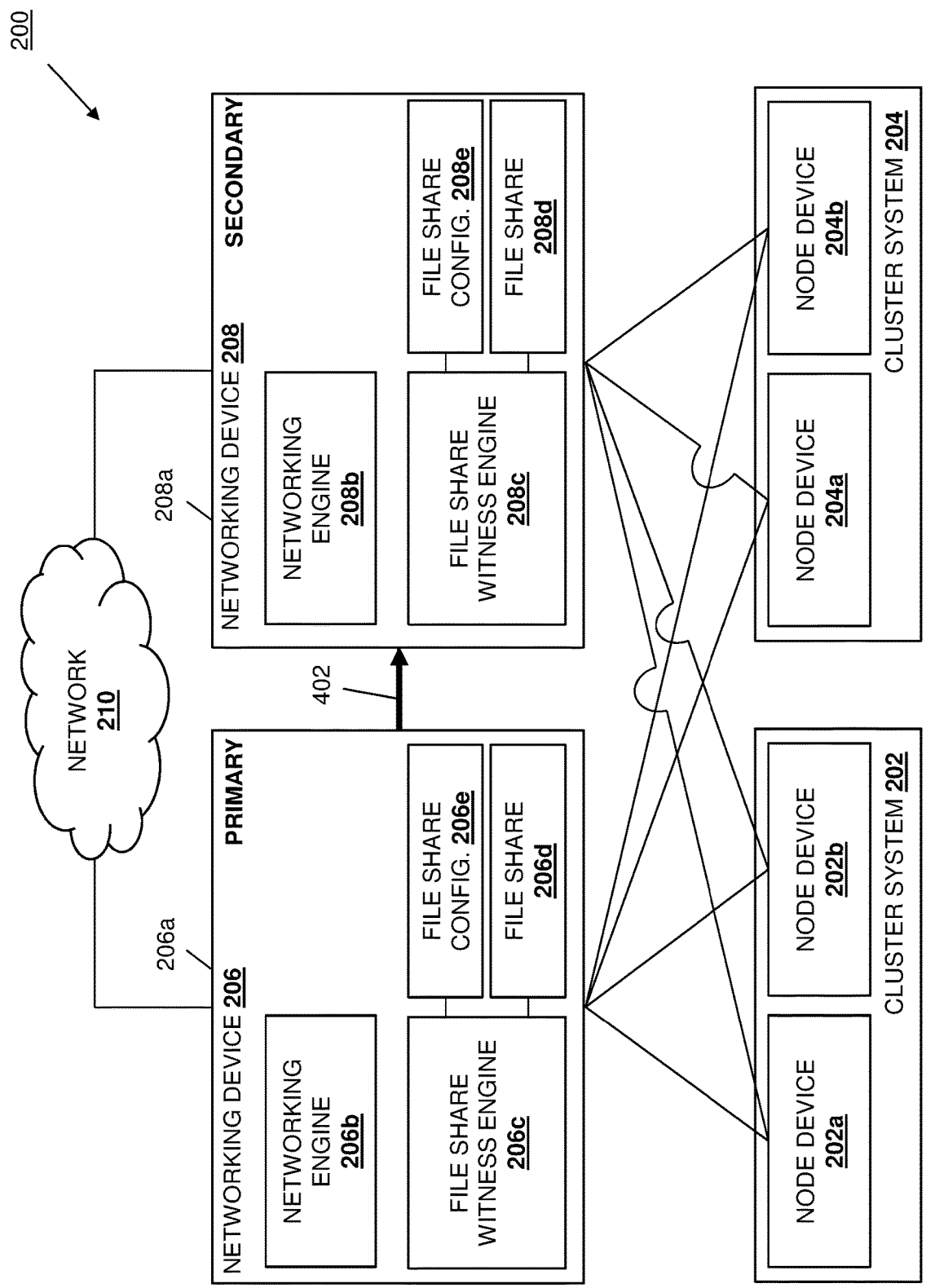
FIG. 4B is a schematic view illustrating an embodiment of the networking-based file share witness system of FIG. 2 operating during the method of FIG. 3.

As will be appreciated by one of skill in the art in possession of the present disclosure, following the initial discovery of the primary/active networking device 206/file share witness service, as well as the provisioning and/or updating of the quorum file stored in the primary/active file share 206d, the secondary/passive networking device 208/file share witness service may operate in a standby mode. As discussed below, updates to the quorum file stored in the file share 206d may be relatively low in frequency, and as the physical memory locations in the networking devices 206 and 208 are not file system locked, replicating the quorum file stored in the primary/active file share 206d to the secondary/passive file share 208d may be initiated only upon detection of the updating of the primary/active file share 206d The method 300 then proceeds to block 306 where the primary networking device replicates the quorum file in the primary file share on a secondary file share in a secondary networking device. As illustrated in FIG. 4B, in an embodiment of block 306, the primary file share witness engine 206c in the primary networking device 206 may operate to perform replication operations 402 to replicate the quorum file stored in its primary file share 206d on the secondary file share 208d included in the secondary/passive networking device 208. As will be appreciated by one of skill in the art in possession of the present disclosure, such replication operations 402 may be performed on a regular schedule, in response to a trigger (e.g., the updating of the quorum file stored in the primary/active file share 206d by the cluster system 202 as discussed above), in response to a manual instruction from a user or other administrator of the networking-based file share witness system 200, and/or in a variety of manners that will fall within the scope of the present disclosure as well. As such, a replica or copy of the quorum file stored in the primary/active file share 206d included in the primary networking device 206 may be kept on the secondary/passive file share 208d included in the secondary networking device 208, and may be used in failover scenarios as discussed below.

Figure 4C:
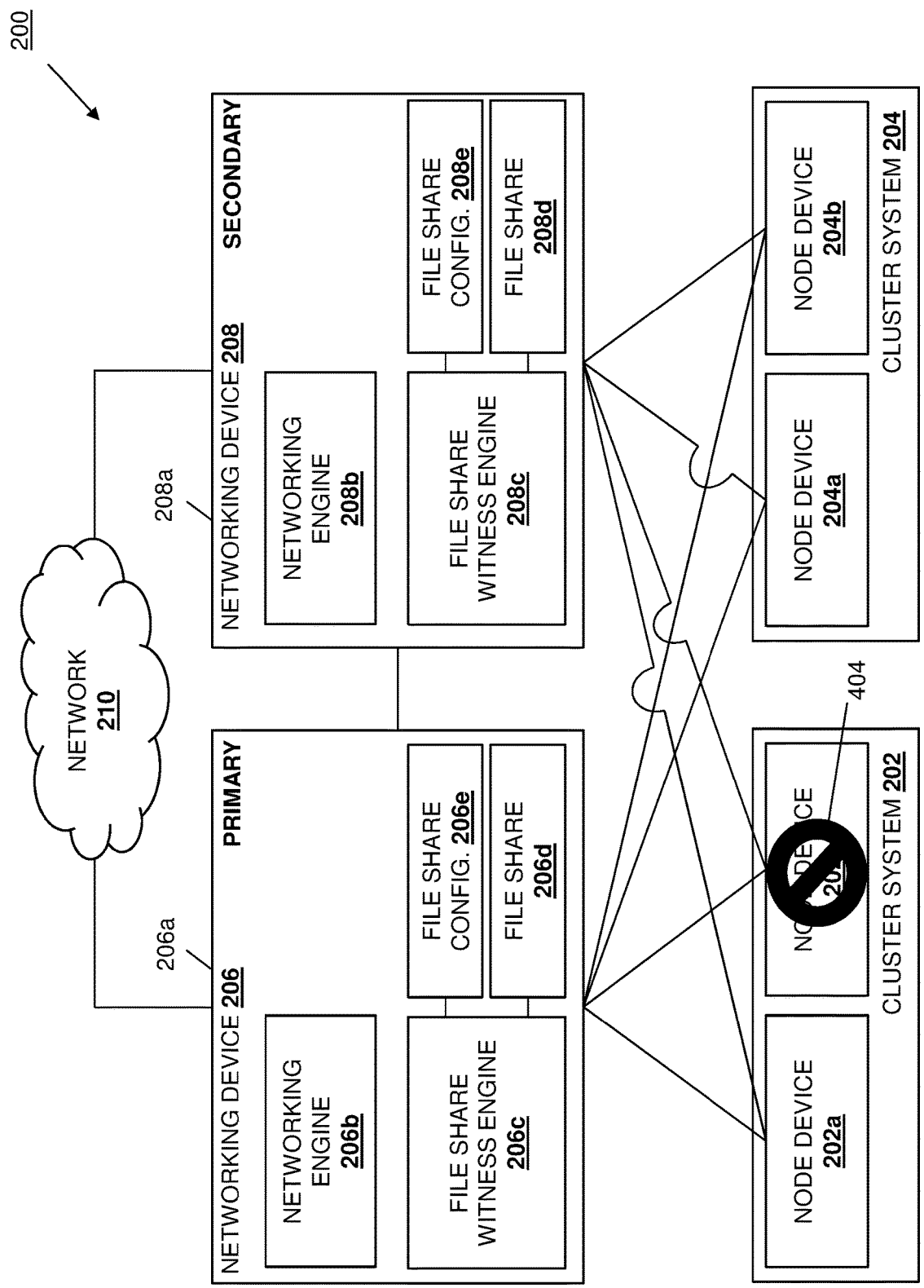
FIG. 4C is a schematic view illustrating an embodiment of the networking-based file share witness system of FIG. 2 operating during the method of FIG. 3.

The method 300 then proceeds to block 308 where the quorum file in the primary file share in the primary networking device provides a file share witness vote. In an embodiment, at block 308, the quorum file stored in the primary/active file share 206d may operate to provide a file share witness vote that may be utilized with at least one node vote provided by at least one of the plurality of node devices in the cluster system 202 that remains available in order to reach a quorum and allow the cluster system 202 to continue to operate. For example, with reference to FIG. 4C, the node device 202b may "go down", fail, and/or otherwise become unavailable (as indicated by element 404 in FIG. 4C). As will be appreciated by one of skill in the art in possession of the present disclosure, in order for the cluster system 202 to remain healthy and functional, it will require a quorum of two votes, and the unavailability of the node device 202b removes one of the two votes available in the cluster system 202. As such, following the unavailability of the node device 202b, a cluster voting function may be initiated in which the node device 202a provides a first vote, and the quorum file stored in the primary/active file share 206d is utilized to provide a second vote, which provides the cluster voting quorum for the cluster system 202 that may elect the node device 202a as the primary node device for the cluster system 202, and allows the cluster system 202 to continue to operate. For example, in the event of the failure of the node device 202b, the node device 202a may access and write data to the primary/active file share 206d, which the cluster voting system will count as a second vote in addition to the first vote provided by the node device 202a, and thus the node device 202a will be elected the primary node device for the cluster system 202. Furthermore, in the event that the node device 202b recovers and/or otherwise subsequently becomes available, the quorum and voting provided by the node device 202a and the quorum file stored in the primary/active file share 206d will ensure that the node device 202b takes a secondary role (e.g., to the primary role taken by the node device 202a) and does not disrupt the operation of the cluster system 202 by, for example, competing for resources of the cluster system 202 with the node device 202a.

The method 300 then proceeds to decision block 310 where it is determined whether the primary networking device is available. In an embodiment, at decision block 310, the networking device 208 may operate to determine whether the networking device 206 is available. As discussed above, the networking device 208 may operate as a secondary/passive networking device that maintains a secondary/passive file share witness service that is includes a file share 208d that stores a quorum file that is copy or replication of the quorum file stored in the file share 206d for purposes of failover, and thus may operate at block 308 to periodically or continuously monitor the operation of the primary networking device 206 to determine whether it is currently available. If, at decision block 310, it is determined that the primary networking device is available, the method 300 returns to block 302. As such, the method 300 may loop such that the primary networking device 206 and the secondary networking device 208 transmit data between the network 210 and the node devices 202a and 202b in the cluster system 202, while the quorum file stored in the primary/active file share 206d is updated and replicated on the secondary/passive file share 208d in the secondary/passive networking device 208, and the quorum file in the primary/active file share 206d provides a file share witness vote in the event a node device in the cluster system 202 becomes unavailable, as along as the primary networking device 206 remains available.

Figure 4D:
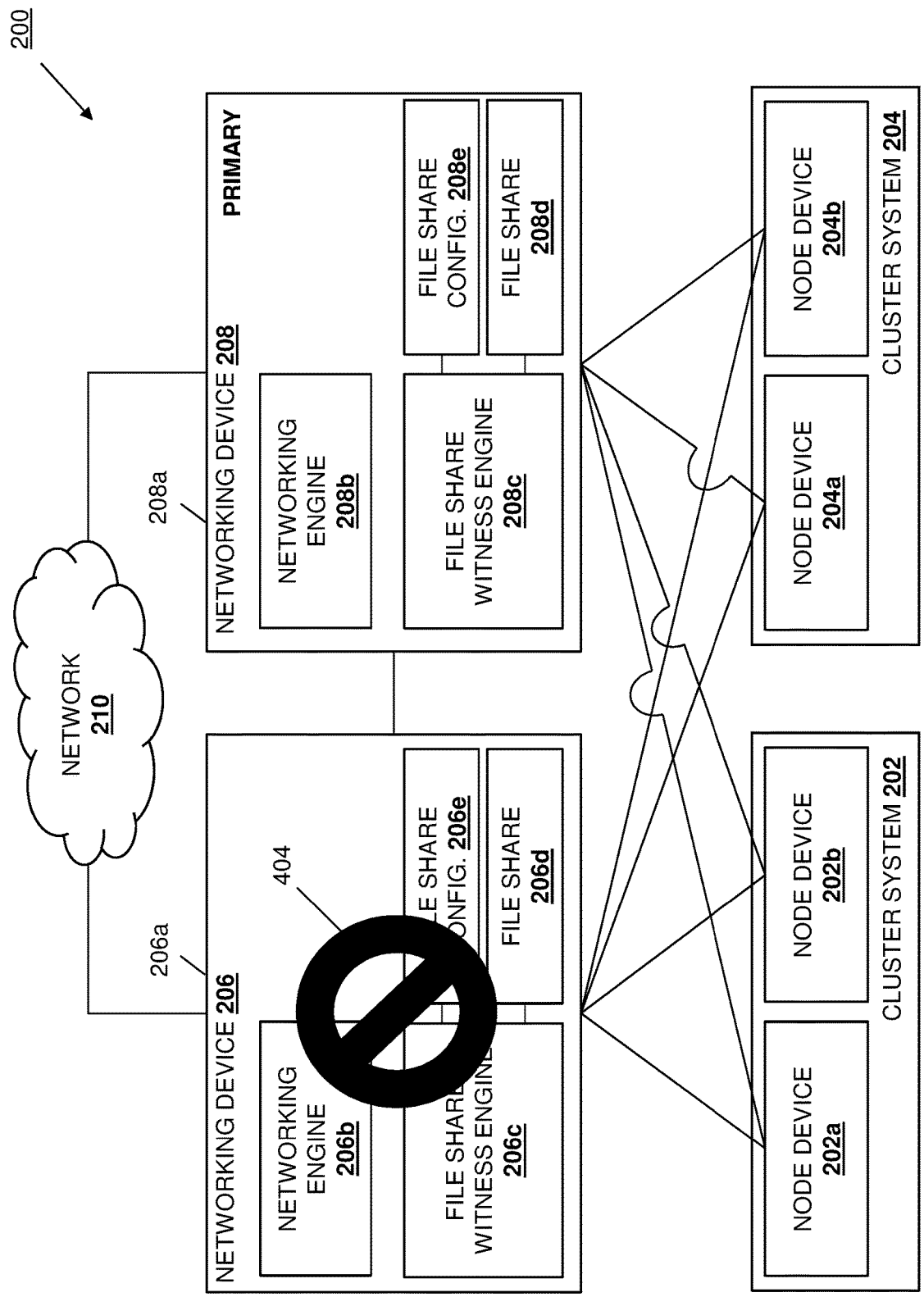
FIG. 4D is a schematic view illustrating an embodiment of the networking-based file share witness system of FIG. 2 operating during the method of FIG. 3.
Figure 4E:
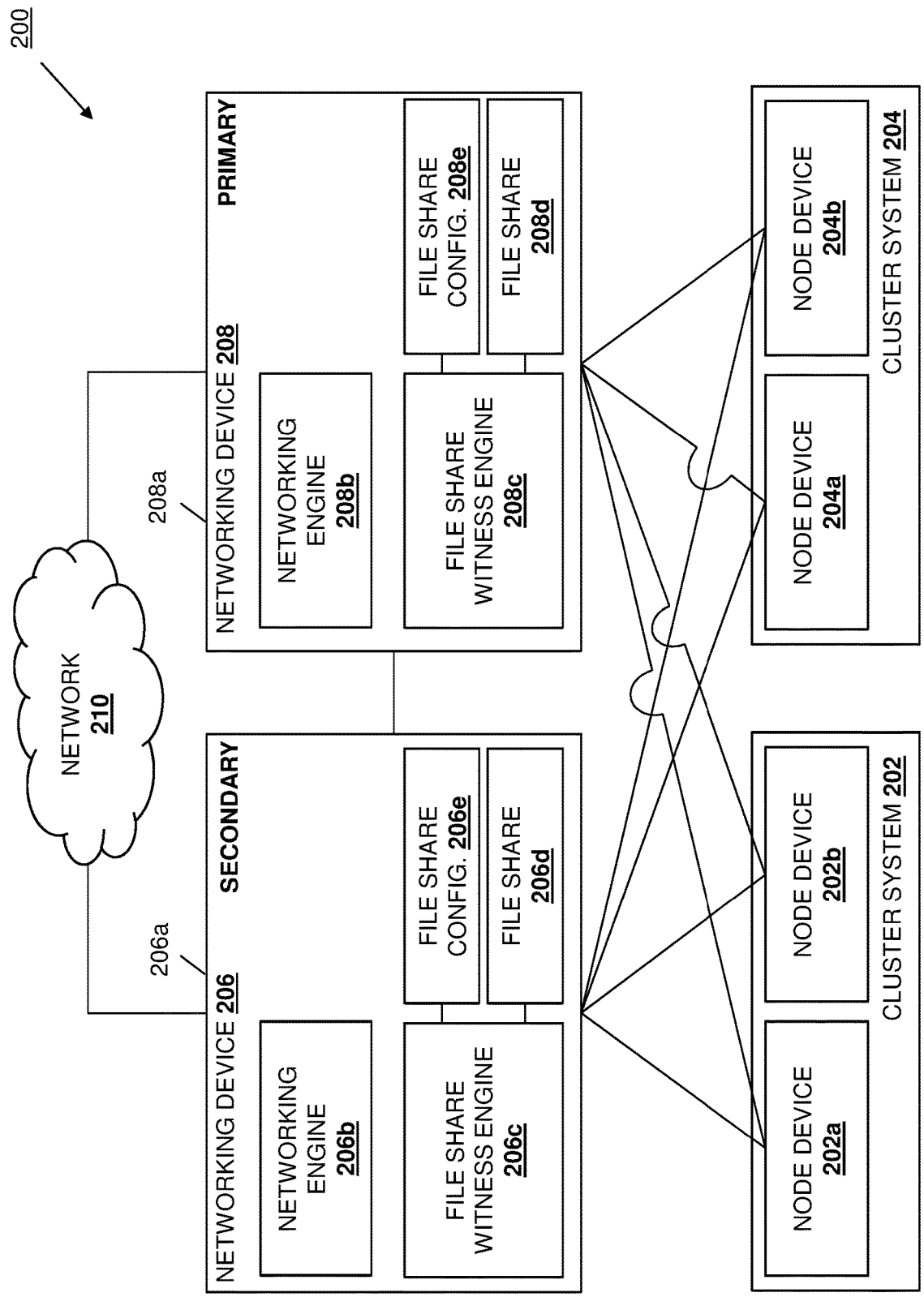
FIG. 4E is a schematic view illustrating an embodiment of the networking-based file share witness system of FIG. 2 operating during the method of FIG. 3.

If at decision block 310, it is determined that the primary networking device is not available, the method 300 proceeds to block 312 where the secondary networking device becomes a primary networking device. As illustrated in FIG. 4D, in an embodiment of decision block 310, the networking device 206 may "go down", fail, and/or otherwise become unavailable (as illustrated by element 406 in FIG. 4D) and, at block 312, the secondary networking device 208 may transition to operating in a primary role (e.g., "PRIMARY"). The modification techniques to switch from operating as a secondary networking device to operating as a primary networking device are known in the art and thus not discussed herein in detail. However, as discussed above, the file share witness service provided by both the primary/active networking device and secondary/passive networking device in the networking-based file share witness system 200 may share a "floating" IP address (e.g., similar to a VRRP floating IP address utilized between two switch devices on an SVI), and thus at block 312 the file share witness service instance provided by the "new" primary/active networking device 208 (e.g., the file share 208d) may be assigned the "floating" IP address. As such, the method 300 may then return to block 302, and the method 300 may loop such that the primary/active networking device 208 (which was previously the secondary/passive networking device 206 on the previous iteration of the method 300) may transmit data between the network 210 and the node devices 202a and 202b in the cluster system 202, while updating the quorum file stored in the primary/active file share 208d, and with that quorum file providing a file share witness vote in the event a node device in the cluster system 202 becomes unavailable. Furthermore, as illustrated in FIG. 4E, in the event the networking device 206 becomes available, the networking device 206 may take on the secondary/passive role and operate as the secondary/passive networking device 206 (i.e., with the networking device 208 operating as the primary/active networking device 208 as discussed above.)

Thus, systems and methods have been described that provide a highly-available file share witness system on TOR switch devices at an edge location in a network that requires no additional infrastructure to support that file share witness service for the HCI system(s) for which it is being provided, and instead centralizes the key voting component requirements for the file share witness service in the redundant TOR switching fabric provided for those HCI system(s) via a write-accessible file share witness service that maintains HCI system autonomy. This may be accomplished via the utilization of a relatively small portion of memory in the TOR switch devices (e.g., 5-10 MB of memory space) to support cluster-voting file share witness requirements via a file share witness service (e.g., on an operating system that is native to the TOR switch device) that is configured to replicate the quorum file stored in the file share across the redundant TOR switch devices provided for the HCI system, each of which may be provided via a hybrid design that provides TOR switch fabric management and file share witness services within the TOR switch fabric architecture. As such, TOR switch devices provided according to the teachings of the present disclosure may include a networking engine that transmits data between a network and a plurality of server devices in an HCI system, and a file share that stores a quorum file that, subsequent to the unavailability of at least one of the plurality of server devices in the HCI system, provides a file share witness vote that is utilized with at least one server vote provided by at least one of the plurality of server devices in the HCI system that remains available in order to reach a quorum and elect the available server device as a primary server device in order to allow the HCI system to continue to operate. Thus, file share witness(es) may be provided at edge locations in a network without the associated hardware overhead and added costs require by conventional file share witness systems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking-based file share witness system, comprising:
a cluster system including a plurality of node devices;
a first networking device that is coupled to a network and to each of the plurality of node devices in the cluster system, wherein the first networking device includes:
a first networking engine that is configured to:
transmit, using a first routing table, data between one or more host devices on the network and the plurality of node devices in the cluster system;
a first file share that is configured to:
store a quorum file that is configured to provide, subsequent to the unavailability of at least one of the plurality of node devices in the cluster system, a first file share witness vote that is configured to be utilized with at least one node vote provided by at least one of the plurality of node devices in the cluster system that remains available in order to reach a quorum and allow the cluster system to continue to operate; and
an Access Control List (ACL) that is configured to allow data transmission to the first file share from an IP address provided to one of the plurality of node devices that operates as a manager of the cluster system; and
a second networking device that is coupled to the network and to each of the plurality of node devices in the cluster system, wherein the second networking device operates as a secondary networking device and includes:
a second networking engine that is configured to:
transmit, using a second routing table, data between the one or more host devices on the network and the plurality of node devices in the cluster system; and
a second file share that is configured, in response to unavailability of the first networking device such that the operation of the second networking device switches from operating as the secondary networking device to the primary networking device, to:
store the quorum file that is configured to provide, subsequent to the unavailability of at least one of the plurality of node devices in the cluster system, a second file share witness vote that is configured to be utilized with at least one node vote provided by at least one of the plurality of node devices in the cluster system that remains available in order to reach a quorum and allow the cluster system to continue to operate.

2. The system of claim 1, wherein the first file share is configured to:
receive, in response to communications with one of the plurality of node devices in the cluster system, an update to the quorum file stored in the first file share.

3. The system of claim 1, wherein the first networking device includes:
a first file share witness engine that is configured to:
replicate the quorum file that is stored in the first file share on a second file share that is included in the second networking device.

4. The system of claim 1, wherein the first file share and the second file share are configured to utilize a common virtual Internet Protocol (IP) address.

5. The system of claim 1, wherein the first file share is associated with a non-default Virtual Local Area Network (VLAN) and an IP classless address space.

6. An Information Handling System (IHS), comprising:
a processing system; and
a memory system that is coupled to the processing system and that includes instructions that, when executed by the processing system, cause the processing system to provide:
   a first networking engine that is configured to:
      transmit, using a first routing table and when operating a primary networking device, data between one or more host device on a network and a plurality of node devices in a cluster system; and
a storage system that is coupled to the processing system and that is configured to provide:
   first file share that is configured to:
      store a quorum file that is configured to provide, subsequent to the unavailability of at least one of the plurality of node devices in the cluster system and in response to unavailability of a first networking device such that the operation of the first networking engine switches from operating as a secondary networking device to the primary networking device, a first file share witness vote that is configured to be utilized with at least one node vote provided by at least one of the plurality of node devices in the cluster system that remains available in order to reach a quorum and allow the cluster system to continue to operate,
      wherein the first file share is associated with an Access Control List (ACL) that is configured to allow data transmission to the first file share from an IP address provided to one of the plurality of node devices that operates as a manager of the cluster system.

7. The IHS of claim 6, wherein the first file share is configured to:
   receive, in response to communications with one of the plurality of node devices in the cluster system, an update to the quorum file stored in the first file share.

8. The IHS of claim 5, wherein the memory system includes instructions that, when executed by the processing system, cause the processing system to provide:
   a first file share witness engine that is configured to:
   replicate the quorum file that is stored on the first file share on a second file share that is included in the first networking device that is coupled to the cluster system.

9. The IHS of claim 6, wherein the first file share is associated with a non-default Virtual Local Area Network (VLAN) and an IP classless address space.

10. A method for providing a networking-based file share witness, comprising:
   transmitting, by a first networking engine in a first networking device and using a first routing table, data between one or more host devices on a network and a plurality of node devices in a cluster system;
   storing, by a first file share in the first networking device subsequent to the unavailability of at least one of the plurality of node devices in the cluster system, a quorum file that is configured to be utilized with at least one node vote provided by at least one of the plurality of node devices in the cluster system that remains available in order to reach a quorum and allow the cluster system to continue to operate,
      wherein the first networking device includes an Access Control List (ACL) that is configured to allow data transmission to the first file share from an IP address provided to one of the plurality of node devices that operates as a manager of the cluster system;
   transmitting, by a second networking engine in a second networking device that operates as a secondary networking device and using a second routing table, data between the one or more host devices on the network and the plurality of node devices in the cluster system; and
   storing, by a second file share in the second networking device subsequent to the unavailability of at least one of the plurality of node devices in the cluster system and in response to unavailability of the first networking device such that the operation of the second networking device switches from operating as the secondary networking device to the primary networking device, the quorum file that is configured to be utilized with at least one node vote provided by at least one of the plurality of node devices in the cluster system that remains available in order to reach a quorum and allow the cluster system to continue to operate.

11. The method of claim 10, further comprising:
   updating, in the first file share in response to communications with one of the plurality of node device in the cluster system, the quorum file stored in the first file share.

12. The method of claim 10, further comprising:
   replicating, by a first file share witness engine in the first networking device, the quorum file that is stored in the first file share in the first networking device to a second file share in the second networking device.

13. The method of claim 10, wherein the first file share and the second file share are configured to utilize a common virtual Internet Protocol (IP) address.

14. The method of claim 10, wherein the first file share is associated with a non-default Virtual Local Area Network (VLAN) and an IP classless address space.

* * * * *